United States Patent [19]

Blaum

[11] Patent Number: 4,511,323

[45] Date of Patent: Apr. 16, 1985

[54] ARRANGEMENT FOR STAMPING OUTER SURFACE OF SHAPED BAR MATERIAL

[75] Inventor: Franz Blaum, Lemberg, Fed. Rep. of Germany

[73] Assignee: Gebrüder Kömmerling Kunststoffwerke GmbH, Pirmasens, Fed. Rep. of Germany

[21] Appl. No.: 486,843

[22] Filed: Apr. 20, 1983

[30] Foreign Application Priority Data

Apr. 23, 1982 [DE] Fed. Rep. of Germany ....... 3215175

[51] Int. Cl.³ .............................................. A21C 11/02
[52] U.S. Cl. .................................. 425/385; 425/405 R
[58] Field of Search ..................... 425/374, 385, 405 R

[56] References Cited

U.S. PATENT DOCUMENTS

| | | | |
|---|---|---|---|
| 2,075,735 | 3/1937 | Loomis | 204/173 |
| 3,384,924 | 5/1968 | Schuetz et al. | 425/385 |
| 3,453,705 | 7/1969 | Kamen | 425/385 |
| 4,078,038 | 3/1978 | Gresham, Jr. | 425/385 |
| 4,266,925 | 5/1981 | Book | 425/405 R |
| 4,362,493 | 12/1982 | Doepel | 425/405 R |
| 4,417,864 | 11/1983 | Shigeo et al. | 425/405 R |

Primary Examiner—Paul Lieberman
Assistant Examiner—Willie Thompson
Attorney, Agent, or Firm—Michael J. Striker

[57] ABSTRACT

An arrangement for stamping an outer surface of a synthetic thermoplastic bar material in thermoplastic condition has a guiding element for a bar material, a rotary stamping tool with a working surface shaped in correspondence with a desired pattern to be stamped and rolling over the bar material, and a negative pressure element located in the region of the stamping tool and arranged for attracting the bar material against the working surface of the stamping tool.

11 Claims, 4 Drawing Figures

ARRANGEMENT FOR STAMPING OUTER SURFACE OF SHAPED BAR MATERIAL

BACKGROUND OF THE INVENTION

The present invention relates to an arrangement for stamping an outer surface of thermoplastic shaped bars immediately after their formation. More particularly, it relates to an arrangement for stamping an outer surface of a synthetic thermoplastic bar material in thermoplastic condition which has mutual guiding a bar material, and a rotary stamping tool having a working surface which is shaped in correspondence with a desired pattern to be stamped and rolls over the bar material to stamp the desired pattern on the latter.

Arrangements of the above mentioned general type are known in the art. One known arrangement is disclosed in U.S. Pat. No. 2,075,735. It describes a stamping arrangement which is located after a forming arrangement and provided with stamping bodies which rotate on a conveyor band in caterpillar-like manner, are arranged at both sides of a newly produced shaped member to be stamped, and acts upon the latter. For this purpose, the stamping outer surface can also be heated. When a pattern must be stamped on the extruded shaped member, it is formed complementary in the stamping outer surface and pressed into the shaped member. The known arrangement is expensive to manufacture. Moreover, the bar material, especially when it is hollow as is the case in many applications, cannot be supported from inside to withstand the stamping pressure. This can lead to undesirable deformations. The above described stamping of the outer surface is desirable, for example, for visible surfaces of synthetic plastic shaped bars which are used for and form blinds, window and door frames, window shutters, etc. Research has been conducted to provide such extruded hollow shaped bars with a hot-stamped pattern. However, the results are not satisfactory, since unevenness of the outer surface of bars leads to defective stamping. Thin-walled shaped members cannot be hot-stamped in general.

SUMMARY OF THE INVENTION

Accordingly, it is an object of the present invention to provide an arrangement for stamping an outer surface of a synthetic thermoplastic bar material, which avoids the disadvantages of the prior art.

More particularly, it is an object of the present invention to provide an arrangement for stamping an outer surface of thin-walled hollow shaped bars, which is capable of providing fine, neat and size-unaffectable stamping in visible surfaces of the material in a simple and economical manner with high uniformity.

In keeping with these objects and with others which will become apparent hereinafter, one feature of the present invention resides, briefly stated, in an arrangement for stamping an outer surface of a synthetic thermoplastic bar material in thermoplastic condition, which has means for guiding a bar material, a rotary stamping tool with a working surface which is shaped in correspondence with a desired pattern to be stamped and rolls over the bar material to stamp the desired pattern on the latter, wherein a negative pressure means is located in the region of the stamping tool and arranged for attracting the bar material against the working surface of the stamping tool.

When the arrangement is designed in accordance with the present invention, the stamping tool or roller runs as a rolling seal over the outer surface of the shaped bar which is just formed and is to be stamped, and the suction provided by the negative pressure attracts the material of the shaped bar against the stamping roller, so that the outer surface of the shaped bar is being provided with fine, distinct and treatment-trace-free shaped pattern corresponding to the outer profile of the stamping roller. The suction action is sufficient for locally attracting the outer surface of the shaped bar forcibly against the stamping roller so as to obtain a neat stamping. At the same time, in the smaller region in which the suction acts upon the shaped bar, it applies only such a low force that it does not significantly affect the size of the shaped bar, which is especially important in the event that the shaped bar is utilized for frames of the above mentioned type.

In accordance with another advantageous feature of the present invention, the stamping roller is arranged prior to a calibrating nozzle. The calibrating nozzle is advantageously a vacuum calibrating nozzle for newly extruded shaped member which is still in thermoplastic condition. The roller can extend through the calibrating surface of the nozzle over a short portion thereof, as considered in transporting direction of the shaped bar. This construction not only prevents undesirable deformation during the stamping step, but also provides the utilization of the relatively short time period during which the shaped bar is deformed after its extrusion, for fine treatment of the same. The calibrating nozzle must be cooled in conventional manner.

When the stamping roller is arranged at the inlet of the calibrating nozzle, the somewhat deformable shaped bar is first provided with a stamped pattern and thereafter is calibrated and fixed by cooling. When the subsequent calibrating step weakens the stamped pattern, it can be compensated by a respective stronger stamping.

When the roller is arranged before a calibrating nozzle, the wall of the nozzle passage can be advantageously provided with a window-like cut-out through which the working surface of the stamping roller extends into the nozzle passage over a stamping depth or the depth of the pattern to be stamped.

It is, however, also possible to use for working of hollow shaped bars such a calibrating nozzle which does not operate with vacuum. In this case, the interior of the hollow shaped bar is loaded with a pressure medium under a negative pressure, for example pressure air, so that the shaped bar in still plastic condition is pressed with its outer surface against the calibrating surface of the calibrating nozzle.

In accordance with a further advantageous feature of the present invention, the roller is located in a negative pressure chamber. As long as air is aspirated, additionally or exclusively, through the working surface of the stamping roller, the roller can be formed as a hollow roller and connected via a hollow shaft with a source of negative pressure. Advantageously, such a stamping roller is arranged in a vacuum box surrounding the calibrating nozzle. The circumferential surface of the roller must be here porous. For this purpose, it can be composed of a porous sintered metal.

Such sufficiently porous material with fine pore structure provides the air permeability required for generation of a suction action, over the entire working surface. Because of the high viscosity and elasticity of the material of the shaped bar, it cannot penetrate into the pores and clog the latter.

The mainly hollow shaped bars in question have in many cases not flat visible surfaces which must be provided with a stamped structure. It has been found that such outer surfaces can be stamped by a stamping roller in accordance with the present invention, when its stamping surface is provided with a curvature or formation corresponding to the so-called non-flat outer surface of the shaped bar, although this curvature is not very strong. Such a stamping roller has a working surface with different radii which at these locations have also respectively different rotary speeds. In contrast, the shaped bar always has on all its surface elements the same translation speed. Thereby a displacement or friction takes place forcibly between individual surface elements of the working surface of the stamping roller, on the one hand, and the oppositely located surface portions of the shaped bar, on the other hand. It has been shown that, to a certain extent, this friction is taken up and compensated by the still soft material of the shaped bar, without undesirably affecting the quality of the stamping. This friction in all cases must be taken into consideration in designing the stamped pattern in the working surface of the stamping roller.

The suction action acts here so that the material of the shaped bar is pulled firmly against the curved working surface of the stamping roller, so that a neat stamping will take place. It is in principle possible and in some cases advantageous when the stamping roller is provided with a drive, so that its rotary speed corresponds to the translation speed of the shaped bar, as closely as possible.

Since as mentioned above a certain slippage is absorbed by the material of the shaped bar without loss of its dimension or distinctness or clarity of the stamped pattern, it is especially advantageous in accordance with a further embodiment of the invention when the roller is supported driveless so that it rotates freely. The bearing for the roller can be arranged inside a vacuum box or the vacuum chamber of the vacuum calibrating nozzle. These features facilitate sealing of the roller against the surrounding air and prevent formation of leakage points which can affect and disturb the application of completely uniform suction negative pressure.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 2:
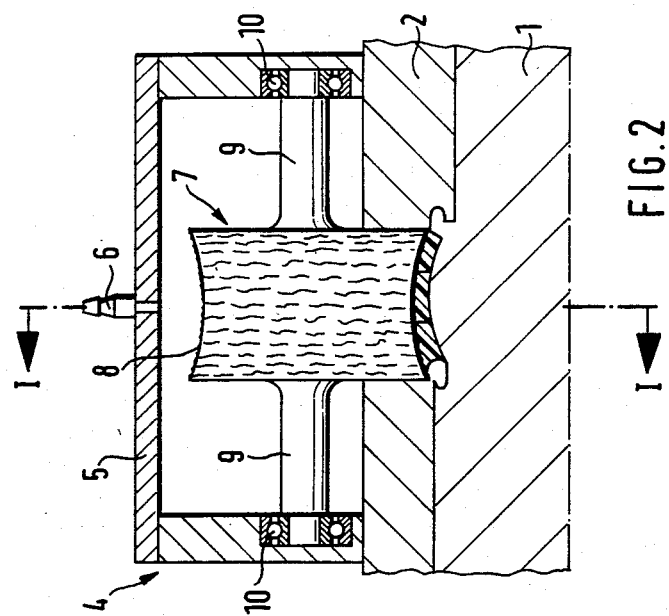
FIG. 2 is a view showing a section of the calibrating nozzle of FIG. 1, taken along the line II—II.

An arrangement for stamping an outer surface of a synthetic thermoplastic bar material in thermoplastic condition in accordance with the present invention has a calibrating nozzle which has a lower nozzle part 1 and an upper nozzle part 2 placed on the lower nozzle part. A calibrating passage is formed between the lower calibrating part 1 and the upper calibrating part 2. A hollow bar 3, for example a roll axle bar, passes through the calibrating passage in direction of the arrow, or from the right side to the left side in FIG. 1. At the right side of the calibrating nozzle, as considered in FIG. 1, an extruding nozzle is arranged which is not shown in the drawing. The hollow shaped member 3 is formed in the extruding nozzle. Immediately after exiting the extruding nozzle, the hollow shaped member 3 enters the inlet of the calibrating nozzle 1, 2 in still plastic or deformable condition. The calibrating nozzle 1, 2 is formed in not shown manner as vacuum calibrating nozzle.

The hollow shaped member is formed of thermoplastic material which during passage through the calibrating nozzle 1, 2 is cooled with simultaneous calibration and hardened. It is, however, possible to use other materials whose hardening and solidification takes place in accordance with other principles, as long as the hollow shaped member 3 passes the calibrating nozzle 1, 2.

Figure 1:
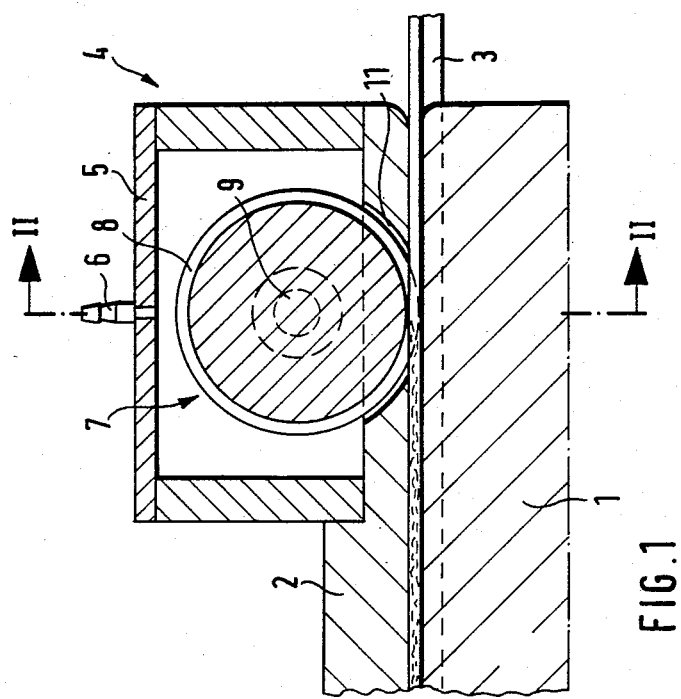
FIG. 1 is a view showing a longitudinal section of an inventive arrangement with a calibrating nozzle, in transporting direction of a hollow shaped bar to be calibrated.

In the inlet region of the calibrating nozzle 1, 2 which is its right side in FIG. 1, the outer surface of the upper calibrating part 2 is cut out. A vacuum box 4 is introduced in this cut-out. The vacuum box 4 has lateral walls which are normal to the transporting direction shown by the arrow, and a cover 5 which extends parallel to the transporting direction.

The cover 5 is placed on the lateral walls, and the lateral walls are placed on the lower calibrating part 2 so that the vacuum box 4 is closed in air-tight manner.

The cover 5 is provided in its central area with a through opening. A connecting nipple 6 is tightly inserted in the through opening for connecting the vacuum box 4 with a suction conduit. The suction conduit is connected, in turn, with a source of negative pressure which makes possible holding the interior of the vacuum box 4 at a certain negative pressure.

A bearing 10 which is advantageously service-free is arranged in the lateral walls of the vacuum box 4, and shaft ends of a shaft 9 is supported in this bearing. The shaft 9 carries in its central part a stamping roller 7. The stamping roller 7 has a stamping outer surface 8 which can be penetrated by pores (not shown). The pores open at the stamping surface 8 of the roller and communicate with the interior of the roller.

As can be seen from FIGS. 1 and 2, the stamping surface 8 has, in axial direction of the roller 7, a non-rectilinear shape which corresponds to the shape of a cross section of a hollow shaped bar 3 to be provided with a stamped pattern. The stamping surface 8 forms in the hollow shaped bar 3 the desired pattern.

As can be seen from FIGS. 1 and 2, a window 11 is formed at the lower side of the stamping roller 7 in the lower calibrating part 2 of the nozzle. The window 11 is formed to closely correspond to a segment of the stamping roller 7 which is inserted in the window 11. The window 11 has a passage which opens downwardly toward the hollow shaped bar 3.

The opening of the window 11 is formed and the distance of the axis of the stamping roller 7 from the outer surface of the hollow shaped bar 3 to be stamped is selected so that the stamping roller 7 extends downwardly into the passage formed between both calibrating nozzle parts 1 and 2 slightly more than the depth of the desired stamping pattern. When elastoplastic material is used, which is deformed both first after covering a certain spring path, the stamping roller 7 extends deeper into the above mentioned passage and/or has a greater diameter.

The inner contour of the window 11 and the outer contour of the stamping roller 7 are dimensioned so that the still elastoplastic synthetic plastic material cannot be aspirated through the separating gap. The sealing of the gap is performed by the outer surface of the synthetic plastic bar which is sucked through the gap and in some cases through the pores of the roller against the circumferential surface of the roller.

In operation of the above described arrangement, the hollow shaped member 3 is pulled by a not shown drive through the calibrating nozzle 1, 2. Thereby the profile of the stamping roller 7 engages into the visible surface of the shaped bar to be stamped, and the stamping roller 7 is dragged with the same. Simultaneously, the interior of the vacuum box 4 is evacuated, whereby an intimate pressure between the stamping surface 8 and the visible surface of the hollow shaped bar 3 to be provided with a pattern takes place.

The movement of the hollow shaped bar 3 applies a dragging action onto the stamping roller 7 and allows free rotation of the latter. Since the bearings 10 have no connection with the outer side of the vacuum box 4, no leakage loss can take place at their locations.

In the event of the utilization of a porous roller, it is also possible to dispense with the air aspiration from a vacuum box and to aspirate the air exclusively from the interior of the roller.

As can be seen from FIG. 2, the lateral region of the stamping surface 8, as seen in axial direction of the stamping roller 7, has a greater rotary speed than the central region of the stamping surface 8. This difference in the rotary speed causes a slippage between the stamping surface 8 of the roller 7 and the outer surface of the hollow shaped bar 3 to be stamped. This slippage is absorbed, however, by the viscous elastic properties of the material of the hollow shaped bar 3. Thereby a neat, clear pattern is obtained in its visible surface.

Figure 4:
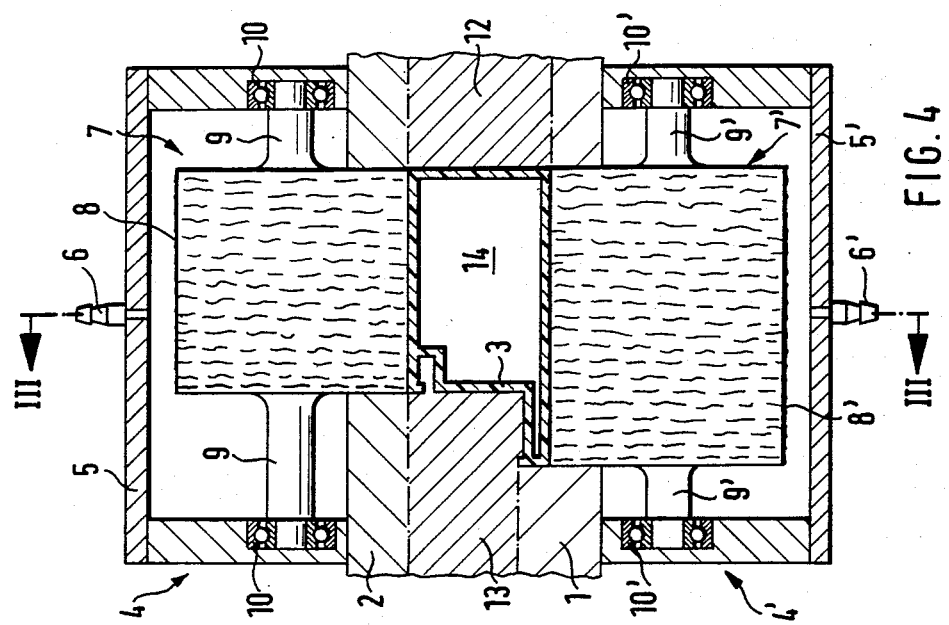
FIG. 4 is a view showing a section of the calibrating nozzle of FIG. 3, taken along the line IV—IV.
Figure 3:
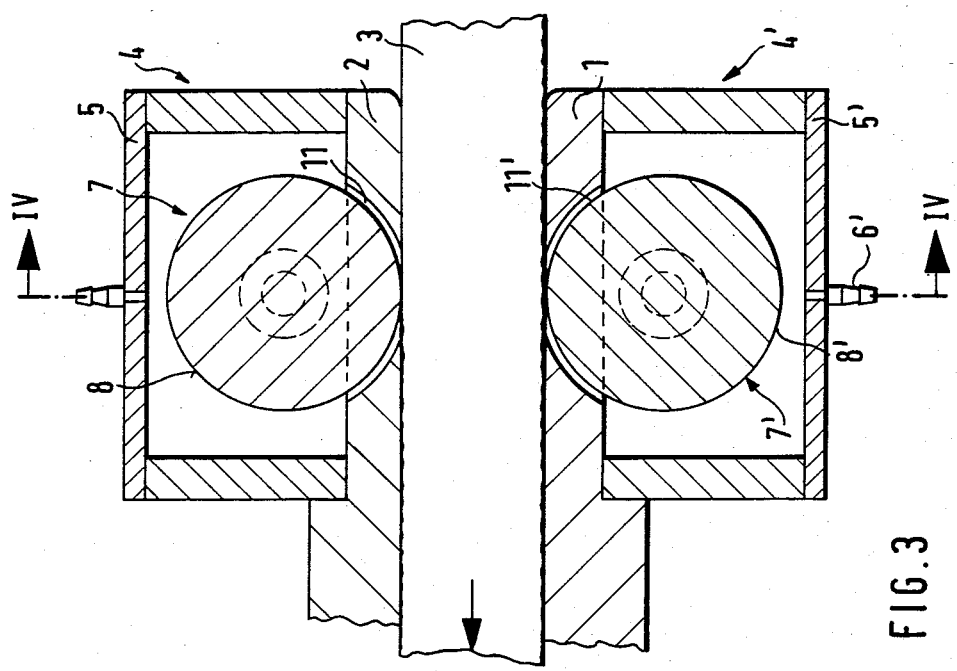
FIG. 3 is a view substantially similar to the view of FIG. 1, but showing a calibrating nozzle which is suitable for another hollow shaped bar.

FIGS. 3 and 4 show another embodiment of the inventive arrangement. The hollow shaped bar 3 of these Figures has two opposite flat visible surfaces which must be provided with profiling or pattern, such as for example a wood texture. Moreover, the hollow shaped bar 3 has a relatively complicated shape and a relatively great unreinforced inner chamber 14.

In correspondence with the complicated shape of the hollow shaped bar 3, the calibrating nozzle has not only upper and lower calibrating parts 2 and 1, but also additionally has two lateral calibrating parts 12 and 13. Each of the lateral calibrating parts 12 and 13 is arranged at the respective side of the hollow shaped bar and limits with its respective inner surface a calibrating passage with a contour corresponding to the desired outer contour of the hollow shaped bar 3.

An additional stamping roller 7' is provided in this arrangement. Both stamping rollers 7 and 7' are arranged, similarly to the embodiment of FIG. 1, in the vacuum box 4 near the inlet of the calibrating nozzle 1, 2, 12, 13. Since the outer surface to be stamped is flat, both stamping rollers 7 and 7' have a cylindrical stamping surface 8 in which a stamping design is formed.

The visible surfaces of the hollow shaped bar 3 have different widths. Therefore, the stamping surfaces 8 and 8' of the stamping rollers 7 and 7' also have the respective different widths.

For improving the calibration or stamping of the hollow shaped bar 3, the inner chamber 14 of the same can be filled with a pressure medium which presses the outer wall of the hollow shaped bar 3 against the inner wall of the calibrating nozzle 1, 2, 12, 13 or against the stamping surfaces 8 and 8'.

The invention is particularly suitable for stamping thin-walled hollow shaped bars with a wall thickness of only 1 mm or less.

It will be understood that each of the elements described above, or two or more together, may also find a useful application in other types of constructions differing from the types described above.

While the invention has been illustrated and described as embodied in an arrangement for stamping a synthetic thermoplastic bar, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for stamping an outer surface of a synthetic thermoplastic bar material in thermoplastic condition, comprising
    means for guiding a bar material;
    a finishing rotary stamping tool having a working surface which is shaped in correspondence with a desired pattern to be stamped and rolls over the bar material to stamp the desired pattern on the latter; and
    negative pressure means located at said stamping tool and arranged so that it attracts the bar material against said working surface of said rotary stamping tool simultaneously with rotation of said rotary stamping tool and formation of the pattern on the bar material.

2. An arrangement as defined in claim 1, wherein said stamping tool is formed as a roller which has a circumferential surface forming said working surface, said negative pressure means being arranged to attract the bar material against said circumferential surface of said roller.

3. An arrangement as defined in claim 2, wherein said negative pressure means includes a negative pressure chamber provided with an opening, said roller having a portion of its circumference, which extends through said opening of said negative pressure chamber.

4. An arrangement as defined in claim 2; and further comprising a calibrating nozzle with an inlet portion which forms said guiding means for the bar material, said roller being arranged at said inlet portion of said calibrating nozzle.

5. An arrangement as defined in claim 4; and further comprising a vacuum calibrating nozzle which has a calibrating surface, said roller being arranged prior to said vacuum calibrating nozzle and extends through a portion of said calibrating surface.

6. An arrangement as defined in claim 2, wherein said roller has a circumferential portion which is air-permeable, and an inner chamber which is under negative pressure.

7. An arrangement as defined in claim 6, wherein said circumferential portion of said roller is composed of a porous material.

8. An arrangement as defined in claim 7, wherein said circumferential portion of said roller is composed of a porous sintered material.

9. An arrangement as defined in claim 2, wherein the outer surface of the bar material is non-flat, said working surface of said roller being shaped in correspondence with the non-flat outer surface of the bar material.

10. An arrangement as defined in claim 1, wherein said roller is arranged so that it freely rotates without a drive.

11. An arrangement as defined in claim 10; and further comprising a bearing which supports said roller for its free rotation.

* * * * *